(12) United States Patent
Takada et al.

(10) Patent No.: US 8,174,223 B2
(45) Date of Patent: May 8, 2012

(54) METHOD OF DETECTING STATE OF SYNCHRONIZATION LOSS IN STEPPING MOTOR

(75) Inventors: Kazuo Takada, Kitasaku-gun (JP); Takayuki Matsui, Fukuroi (JP); Haruka Miyaji, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 527 days.

(21) Appl. No.: 12/382,853

(22) Filed: Mar. 25, 2009

(65) Prior Publication Data

US 2009/0256515 A1 Oct. 15, 2009

(30) Foreign Application Priority Data

Apr. 11, 2008 (JP) ................................. 2008-103830

(51) Int. Cl.
*H02P 6/18* (2006.01)
*H02P 8/00* (2006.01)

(52) U.S. Cl. ................... 318/400.34; 318/685

(58) Field of Classification Search .................. 318/685, 318/696, 400.34; 388/928.1
See application file for complete search history.

(56) References Cited

U.S. PATENT DOCUMENTS

| | | | |
|---|---|---|---|
| 4,743,848 A * | 5/1988 | Krimm et al. | 324/765.01 |
| 6,486,633 B1 * | 11/2002 | Kronenberg | 318/700 |
| 6,586,898 B2 * | 7/2003 | King et al. | 318/400.34 |
| 2002/0185926 A1 * | 12/2002 | King et al. | 310/68 B |
| 2011/0074321 A1 * | 3/2011 | Takai | 318/400.04 |
| 2011/0181229 A1 * | 7/2011 | Galic et al. | 318/696 |

FOREIGN PATENT DOCUMENTS

| | | |
|---|---|---|
| EP | 1 460 757 A1 | 9/2004 |
| JP | A-2000-166297 | 6/2000 |

* cited by examiner

*Primary Examiner* — Eduardo Colon
(74) *Attorney, Agent, or Firm* — Oliff & Berridge, PLC

(57) ABSTRACT

In a method of detecting synchronization loss in a stepping motor, a means for applying either control current or control voltage to a coil of each phase to thereby drive a stepping motor and a means for individually measuring a back EMF voltage induced at the coil of each phase are employed, wherein application of either the control current or the control voltage at the coil of each phase is halted by turns phase by phase for such a short time period as not to affect rotation of a rotor of the stepping motor at a predetermined timing within one step period of the rotor, the back EMF voltage at the coil is measured during the short time period, and the stepping motor is judged to lose synchronization when the measurement result of the back EMF voltage at the coil of at least one phase satisfies a detection criterion.

8 Claims, 5 Drawing Sheets

F I G. 5 A 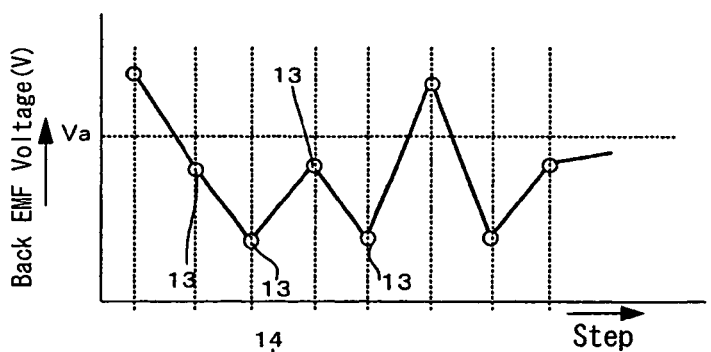
F I G. 5 B 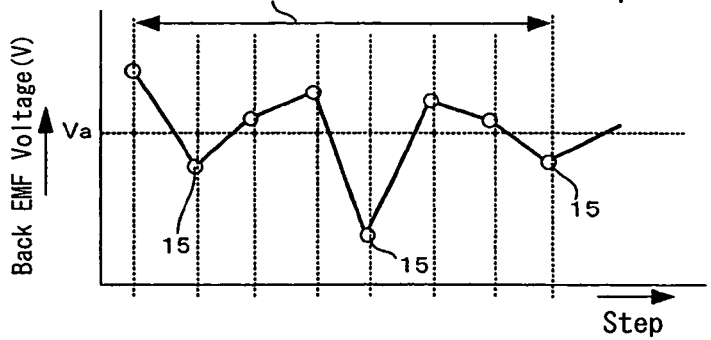
F I G. 5 C 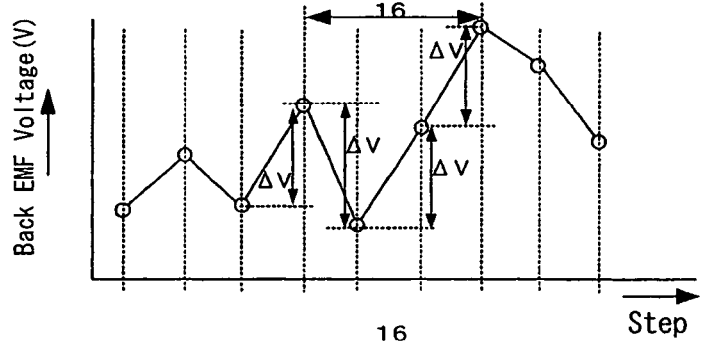
F I G. 5 D 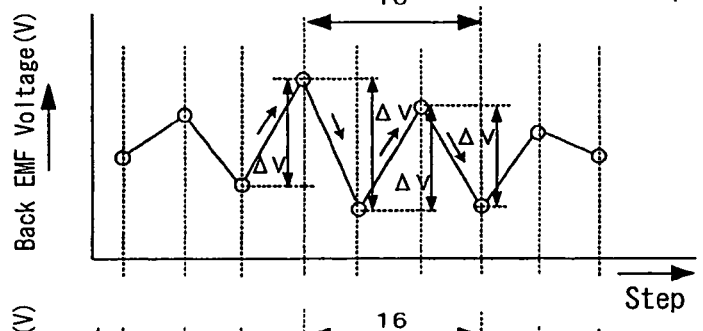
F I G. 5 E 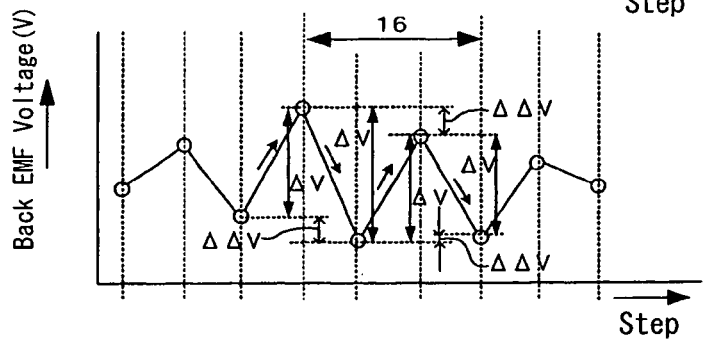

METHOD OF DETECTING STATE OF SYNCHRONIZATION LOSS IN STEPPING MOTOR

BACKGROUND OF THE INVENTION

1. Field of the Invention

The present invention relates to a method of detecting a state of synchronization loss in a stepping motor. Specifically, the present invention relates to a method of detecting a state of synchronization loss, in which the state of synchronization loss in an N-phase stepping motor is detected by using a means for applying either control current or voltage to a coil of each phase to thereby drive the N-phase stepping motor and a means for individually measuring a back EMF voltage induced at the coil of each phase.

2. Description of the Related Art

FIG. 1 shows an outline of an electric circuit of a stepping motor 1. In this example, the stepping motor 1 is a two-phase bipolar stepping motor driven by two-phase (phase A and phase B) excitation. The stepping motor 1, as well known, includes: a rotor 3 having a permanent magnet with a multi-pole magnetization arranged such that two kinds of magnetic poles (N, S) 2 are alternately arrayed in the circumferential direction; at least two stator yokes disposed around the rotor 3 so as to form a multiphase magnetic field with at least two phase; and coils 4 to excite the stator yokes. When pulsed control signals (1a, 1b) are applied to the coils 4 by a driving circuit 5, the rotor 3 is caused to rotate according to a predetermined step unit, wherein the rotation angle and the rotation speed of the rotor 3 can be highly precisely controlled by the number and cycle of pulse signals.

The stepping motor, while advantageous in that thanks to its structure the rotor is free from mechanical contact with the stator thus enabling a long life and in that a large static torque can be produced at the time of excitation, has the problem that the rotor fails to normally rotate when the pulse signal has a short cycle or when the load is large, thus causing a so-called synchronization loss. The stepping motor is frequently used for precisely controlling the rotation angle and speed, and therefore, when the stepping motor loses synchronization, it is necessary to detect the malfunction state immediately and then perform an error handling procedure, such as halt of the rotation or restoration to the normal rotation. To this end, the stepping motor is often equipped with a circuit or a system for detecting a state of synchronization loss and then performing an error handling procedure.

Conventional methods of detecting a state of synchronization loss are described in, for example, Japanese Patent Application Laid-Open No. 2000-166297 and European Patent Application Laid-Open No. EP1460757, in which back EMF voltages (refer to VA, VB in FIG. 1) induced at coils by the rotational behavior of a rotor are measured thereby detecting a state of synchronization loss. Specifically, Japanese Patent Application Laid-Open No. 2000-166297 discloses a method of detecting the state of synchronization loss according to the waveform of a back EMF voltage induced at a coil of at least one phase of an N-phase stepping motor. Also, European Patent Application Laid-Open No. EP1460757 discloses a method of precisely detecting a state of synchronization loss in such a manner that a control signal is halted in each step unit for such a short period of time as not to affect the motor rotation wherein a back EMF voltage induced at a coil is measured during the period of time.

FIGS. 2A and 2B outline the technique of detecting a state of synchronization loss disclosed in European Patent Application Laid-Open No. EP1460757, wherein control signal waveforms (control current waveforms) of a two-phase stepping motor are shown. It is arranged at each of Phases A and B that each control signal is halted at a predetermined timing in each step period (stp) for such a minute period of time (halt time) (t) as not to affect the motor rotation. In this example, the halt time t is provided before and after each of inversion timings (T1 to T6) at which current polarity is changed, and a back EMF voltage is measured during the halt time (t).

The above described methods of detecting a state of synchronization loss may employ an external circuit provided outside, may be incorporated into an IC as an algorithm of a program, or may be installed as a software of a computer, wherein back EMF voltage signals from the coil or data corresponding to the signal are inputted to the electric circuit, the IC or the computer, and if the state of synchronization loss is detected, then a detection signal for indicating synchronization loss is outputted. After the detection signal is outputted, an appropriate error handling procedure is performed, for example, a driving circuit to generate a control signal is to be feedback-controlled according to the detection signal.

The present inventors, et al made a field-investigation into the conventional methods of detecting synchronization loss and found out that it happens with a high probability that the circuit functions improperly such that synchronization loss is judged to occur even prior to actually occurring or fails to be detected in spite of actually occurring. This happens because the motor, when losing synchronization, is caused to rotate and halt repeatedly with short quick steps instead of stopping its rotation, wherein the state of repetition of rotation and halt is significantly fluctuated depending on motor rotation speed, the load, and the positional relation between the stator yoke and the magnetic domain of the multipole-magnetized rotor. Accordingly, the back EMF voltage fluctuation to indicate the state of synchronization loss is diversified, and therefore it is not possible to determine the occurrence of synchronization loss based simply on the assumption that the back EMF voltage fluctuates in a predetermined manner at a predetermined coil of at least one phase as described in Japanese Patent Application Laid-Open No. 2000-166297. Also, it is not possible to successfully achieve a sufficient precision if only the measurement method of the back EMF voltage is innovated as described in European Patent Application Laid-Open No. EP1460757.

Further, the present inventors, et al conducted a simulation for detecting synchronization loss according to the method described in European Patent Application Laid-Open No. EP1460757. Specifically, a gear box was combined with the stepping motor 1 shown in FIG. 1 thereby providing an actuator, and the back EMF voltages (VA, VB) were measured at the time of increasingly applying a torque load to the output gear of the actuator as well as at the time of locking the output gear, that is, at the state of synchronization loss, and the result gained when the algorithm based on the method described in European Patent Application Laid-Open No. EP1460757 was applied was simulated. In this connection, when the output gear was locked, the positional relation between the stator yoke and the magnetic poles 2 was shifted at each test thereby reproducing various states of synchronization loss. The simulation result shows that the stepping motor 1 is judged to lose synchronization when rotating with a torque corresponding to about 70% of the torque value at which the stepping motor 1 actually gets out of synchronization, which means that the maximum torque of the stepping motor 1 cannot be fully utilized. Also, it was found out that the state of synchronization loss is detected with a probability of 85%.

The present inventors, et al have been studying a back EMF voltage and assumed that in order to detect synchronization loss of a stepping motor with an enhanced precision, it is necessary to closely analyze the back EMF voltage and its fluctuation mode at the time of synchronization loss. As a result of the study, it was found out that it is important to judge (or identify) the loss of motor synchronization at the very time of detecting an indication of synchronization loss at any one of phases when the back EMF is analyzed individually at each phase of an N-phase stepping motor. Also, it was found out that the value of back EMF voltage or the fluctuation pattern thereof at the time of synchronization loss are not uniform but diversified.

SUMMARY OF THE INVENTION

The present invention has been made in light of the problems described above and also made based on the above findings, and it is an object of the present invention to provide a method of detecting a state of synchronization loss, which is performed based on a back EMF voltage induced at a coil, and in which the state of synchronization loss can be precisely detected while the maximum motor torque can be fully utilized.

In order to achieve the object described above, according to an aspect of the present invention, there is provided a method of detecting a state of synchronization loss in a stepping motor, in which a means for applying either control current or control voltage to a coil of each phase to thereby drive an N-phase stepping motor and a means for individually measuring a back EMF voltage induced at the coil of each phase are employed, wherein application of either the control current or the control voltage at the coil of each phase is halted by turns phase by phase for such a short period of time as not to affect the rotation of a rotor of the stepping motor at a predetermined timing within one step period of the rotor, the back EMF voltage at the coil is measured during the short period of time, and the stepping motor is judged to lose synchronization when the measurement result of the back EMF voltage at the coil of at least one phase satisfies a predetermined detection criterion.

In the aspect of the present invention, the detection criterion may be defined by any one of (A) to (D) which follow below:

(A) The back EMF voltage measures at or below the predetermined value Va.
(B) The back EMF voltage measures at or below the predetermined value Va for at least a predetermined consecutive number (a) of times.
(C) The back EMF voltage measures at or below the predetermine value Va for at least a predetermined number (c) of times through a predetermined number (b) of measuring points.
(D) The absolute value of the back EMF fluctuation between adjacent measuring points measures at or above the predetermined value Vb.

In the present invention, the detection criterion may be further defined such that any one of the above described (A) to (C) is combined with either (E), (E) and (F), or (E) to (G):

(E) The absolute value of the back EMF fluctuation between adjacent measuring points measures at or above the predetermined value Vb.
(F) The absolute value of the back EMF fluctuation between adjacent measuring points measures at or above the predetermined value Vb for at least a predetermined number (d) of times.
(G) The difference between adjacent absolute values of the back EMF voltage fluctuation between adjacent measuring points measures at or below the predetermined value Vc.

Thus, according to the present invention, the state of synchronization loss can be further precisely detected while the maximum motor torque can be fully utilized.

BRIEF DESCRIPTION OF THE DRAWINGS

FIGS. 5A to 5E are schematic graphs of detection criteria for the state of synchronization loss.

DETAILED DESCRIPTION OF THE INVENTION

Exemplary embodiments of the present invention will hereinafter be described with reference to the accompanying drawings.

===Measurement of Back EMF===

Figure 1:
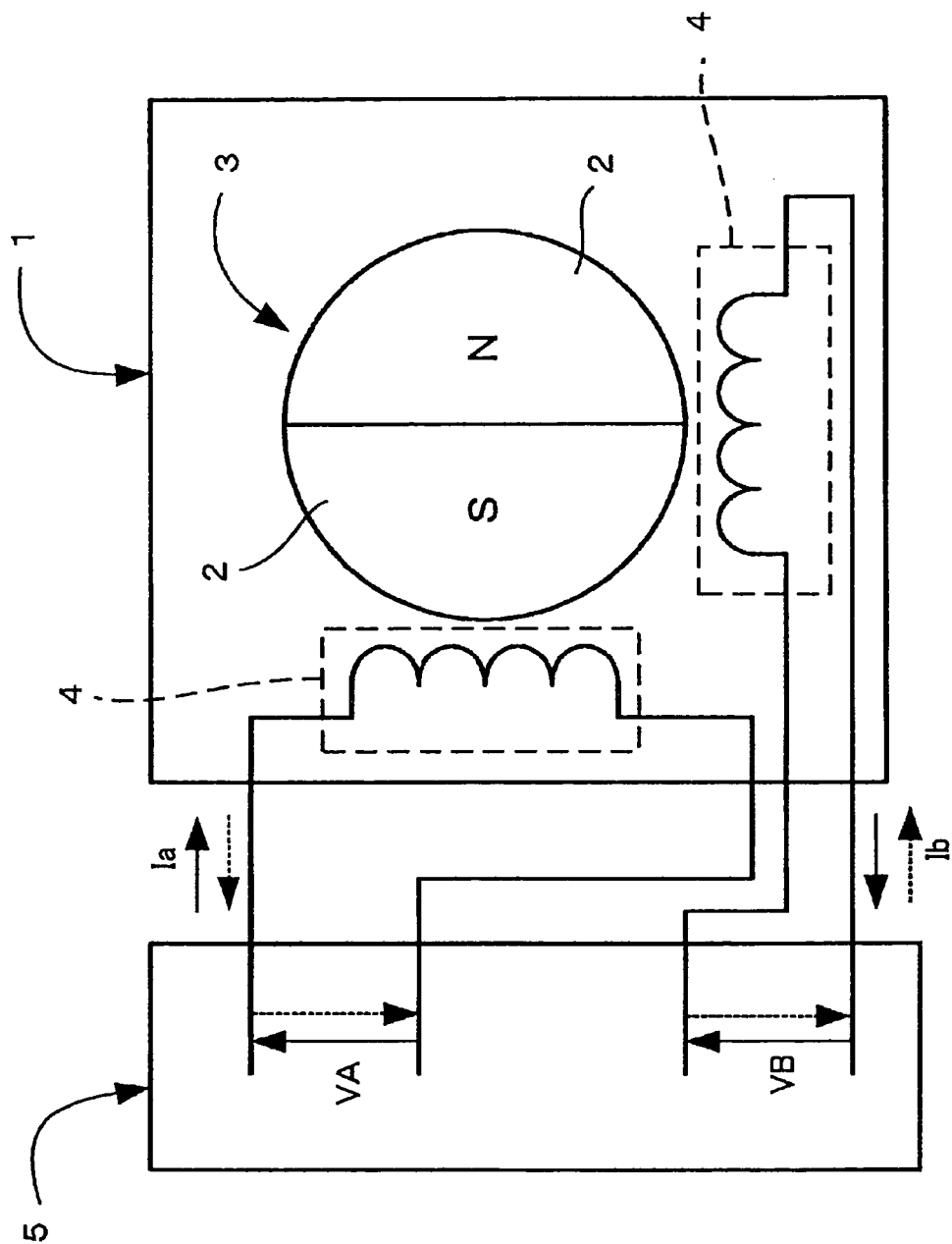
FIG. 1 is a circuit diagram of a two-phase stepping motor.
Figure 2A:
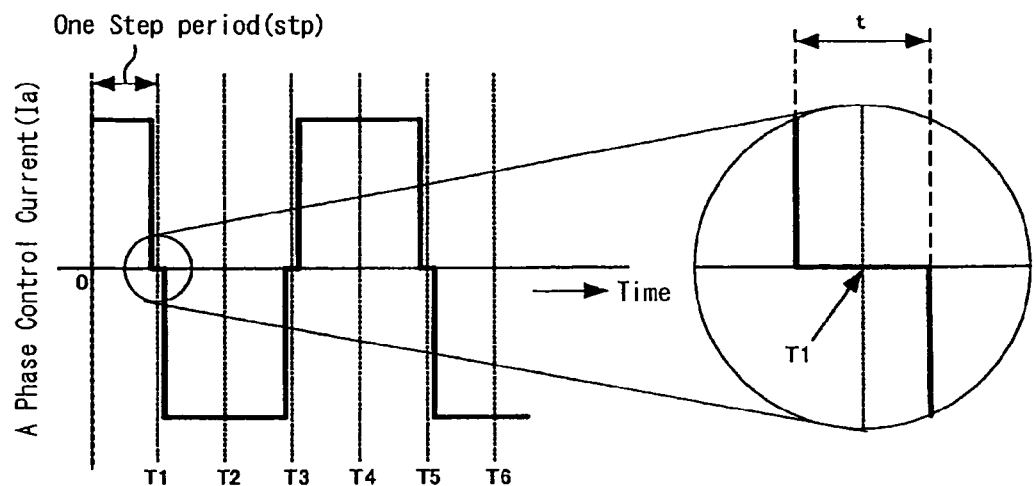
FIGS. 2A and 2B are schematic views of a method of measuring a back EMF voltage in a method of detecting a state of synchronization loss according to the present invention.
Figure 2B:
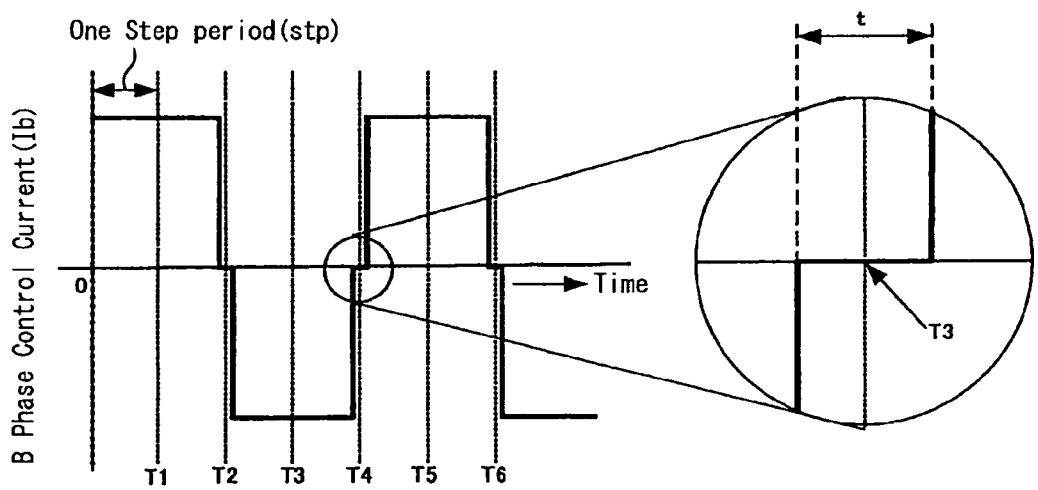

The present invention may be embodied, for example, by means of an IC provided with a program to control a stepping motor according to an algorithm according to the present invention, to measure a back EMF voltage at a coil of each phase, and also to judge the state of synchronization loss based on the measurement result, and by means of a computer having the above described program installed therein, wherein the IC and the computer are adapted to measure the back EMF voltage by running the program, and if the measurement result indicates the state of synchronization loss, then an appropriate indication is outputted exactly when the indication signal is detected. Also, in the present invention, a signal halt time period is provided at each step period (stp) so as to appear alternately at phase A and phase B as shown in FIGS. 2A and 2B, and the back EMF voltage at the signal halt time period is measured phase by phase.

===Back EMF Voltage Characteristics Obtained when a Rotor Rotates Normally===

First, the fluctuation of a back EMF voltage induced at a coil of each phase of a two-phase stepping motor was measured when a rotor was rotating normally. For performing the measurement, an actuator was constituted by a stepping motor and a gear box as described above, and the back EMF voltage was measured at each of phase A and phase B when the maximum load to allow a motor rotation was applied to the output gear of the actuator (under load) and also when no load was applied to the output gear of the actuator (under no load). The measurement results are shown in graphs of FIGS. 3A to 3C. In this connection, the back EMF voltage value marked by Va is the minimum value which is obtained when the rotor was rotating and which is a threshold value as a benchmark for detecting synchronization loss.

Figure 3A:
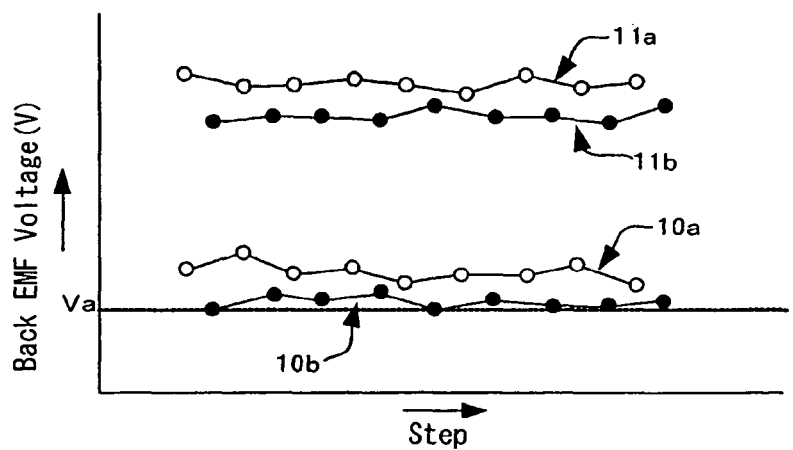
FIGS. 3A to 3C are graphs of fluctuation patterns of back EMF voltages at respective phases obtained when the stepping motor rotates normally.
Figure 3B:
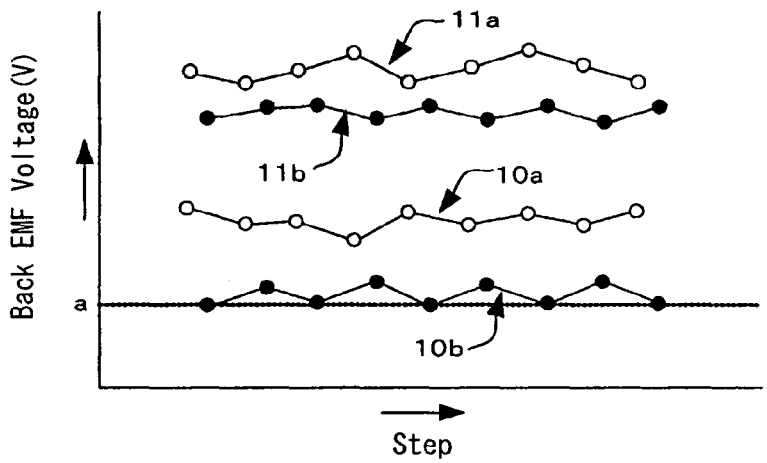
Figure 3C:
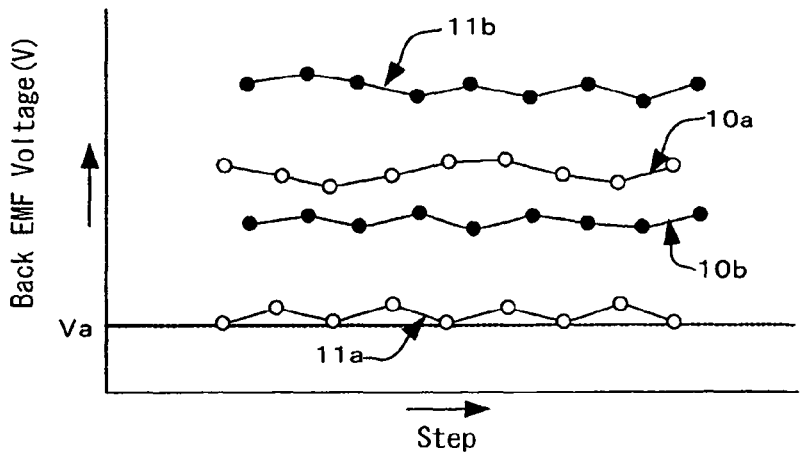

Referring to FIGS. 3A to 3C, no regularity is found in the fluctuation pattern of the back EMF voltage at Phase A (10a, 11a), Phase B (10b, 11b), under load (10a, 10b) and under no load (11a, 11b) obtained when the motor is running, for example, such that the threshold value Va is measured "at Phase B under load (10b)" in FIGS. 3A and 3B while measured "at Phase A under no load (11a)" in FIG. 3C. Also, with regard to the rise and fall of the back EMF voltage at adjacent measuring points, a regularity is seen, for example, "at Phase B under load (10b)" shown in FIG. 3B and "at Phase under no load (11a)" shown in FIG. 3C, where the back EMF voltage rises and falls in an alternate manner, while such a regularity is not seen in other back EMF voltage characteristics.

===Back EMF Voltage Characteristics Obtained when the Motor Loses Synchronization===

Figure 4A:
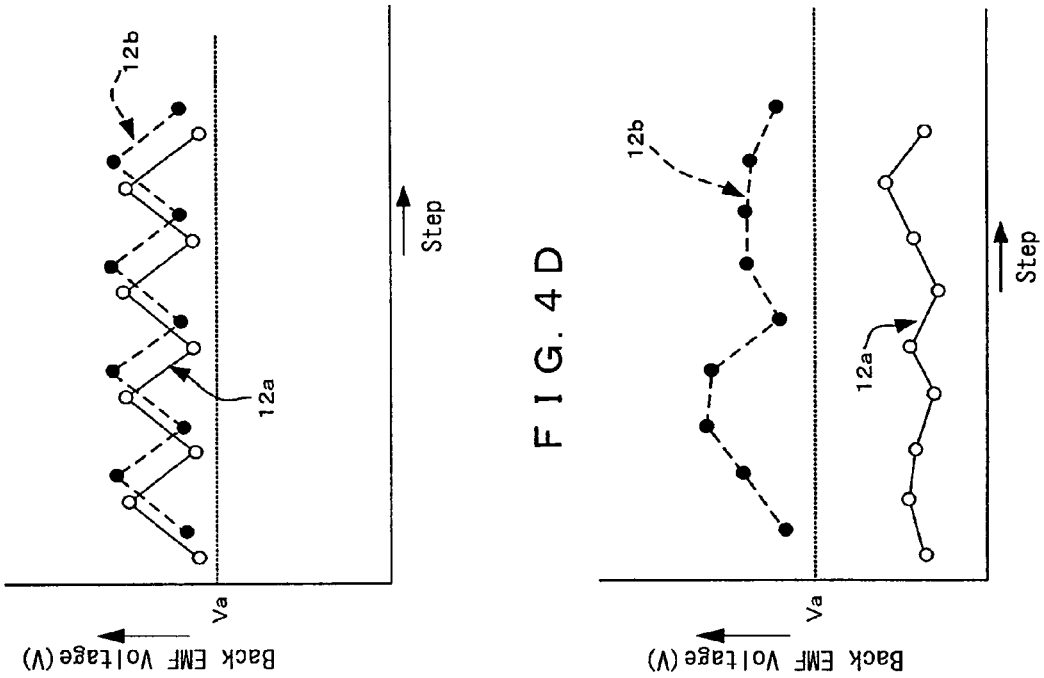
FIGS. 4A to 4D are graphs of fluctuation patterns of back EMF voltages at the respective phases obtained when the stepping motor loses synchronization.
Figure 4C:
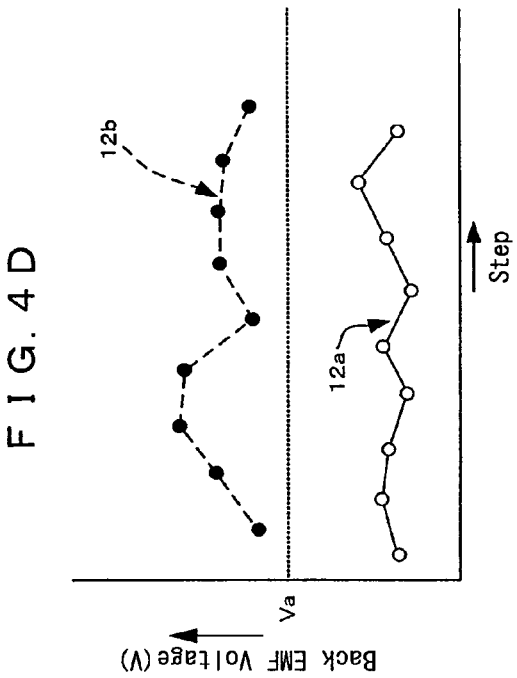
Figure 4B:
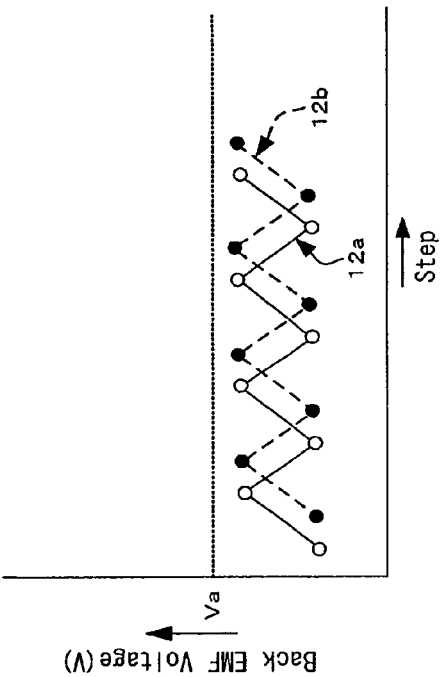
Figure 4D:
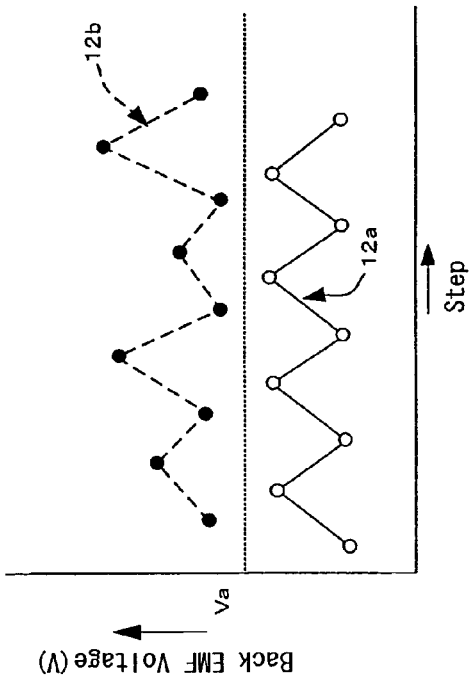

Next, the back EMF voltage was measured when the output gear of the actuator was locked thereby driving the motor out of synchronization. The measurement result shows that there are various types of fluctuation patterns in the back EMF voltages at Phase A and Phase B when the motor loses synchronization. Some of the fluctuation pattern types are shown in graphs of FIGS. 4A to 4D. FIG. 4A shows that both back EMF voltages (12a, 12b) at Phase A and Phase B rise and fall alternately at each measuring point wherein both thereof stay at or below the threshold value Va, FIG. 4B shows that both back EMF voltages (12a, 12b) at Phase A and Phase B rise and fall alternately at each measuring point wherein one (12a) of both thereof stays at or below the threshold value Va, FIG. 4C shows that back EMF voltages (12a, 12b) at Phase A and Phase B rise and fall alternately at each measuring point wherein both thereof stay at or above the threshold value Va, and FIG. 4D shows that both back EMF voltages (12a, 12b) at Phase A and Phase B rise and fall irregularly at each measuring point wherein one (12a) of both thereof stays at or below the threshold value Va. The result here characteristically shows that the fluctuation value of the back EMF voltage is larger when the motor loses synchronization than when the motor rotates normally.

It can be said that it is possible that the motor loses synchronization if the fluctuation patterns shown in FIGS. 4A to 4B are obtained by the measurement, but in order to precisely detect synchronization loss from the fluctuation patterns, it is necessary to define more concrete criteria for determining the state of synchronization loss which are potentially present in the fluctuation patterns. So, the present inventors, et al analyzed the various fluctuation patterns in greater detail and succeeded in establishing some criteria for detecting a state of synchronization loss.

Criteria (1) to (5) described below refer to examples of detecting a state of synchronization loss and will be explained with reference to FIGS. 5A to 5E, respectively.

(1) A back EMF voltage V at any one phase measures at or below the threshold value Va for at least a predetermined consecutive number (a: reference numeral 13) of times: FIG. 5A, (2) A back EMF voltage V at any one phase measures at or below the threshold value Va for at least a predetermined number (c: reference numeral 15) of times through a predetermined number (b: reference numeral 14) of measuring points: FIG. 5B, (3) A back EMF voltage difference (absolute value of a back EMF voltage fluctuation) ΔV found between adjacent measuring points at any one phase measures at or above a predetermined threshold value Vb for at least a predetermined consecutive number (d: reference numeral 16) of measuring points: FIG. 5C, (4) In addition to Criterion (3), a back EMF voltage obtained at each of (d times of) consecutive measuring points in Criterion (3) rises and falls in an alternate manner: FIG. 5D, and (5) In addition to Criteria (3) and (4), a difference (absolute value of the fluctuation between respective absolute values ΔV of adjacent back EMF voltage fluctuations) ΔΔV found between adjacent rise and fall values in Criterion (4) measures at or below a predetermined threshold Vc: FIG. 5E.

In this connection, the threshold values Vb and Vc can be calculated from the measurement value of the back EMF voltage obtained when the output gear of the actuator is locked whereby the motor is caused to lose synchronization presenting the fluctuation patterns of Criteria (3) and (5).

===Torque Value Obtained when Detecting Synchronization Loss, and Probability of Detecting Synchronization Loss===

Field tests (first to fifth embodiments) were conducted to see if the state of synchronization loss of the motor in the actuator can be appropriately detected according respectively to Criteria (1) to (5) described above. In addition to the above tests which were performed by applying Criteria (1) to (5) singularly and independently, a test (sixth embodiment) was conducted by applying Criterion (6) which is defined such that either Criterion (2) or (4) is satisfied, and still another test (seventh embodiment) was conducted by applying Criterion (7) which is defined such that either Criterion (2) or (5) is satisfied. In the tests conducted as described above, the numbers (a) to (d) of times or measuring points are set as follows: a=3, b=8, c=3, and d=4.

The test results are shown in Table 1 below.

TABLE 1

| Test | Detection criterion | Method 1 *T (%) | Method 2 **P (%) |
|---|---|---|---|
| (1) | Back EMF voltage at any one phase measures at or below the threshold value Va for three or more consecutive times | 100 | 90 |
| (2) | Back EMF voltage at any one phase measures at or below the threshold value Va for three or more times through eight consecutive measuring points | 100 | 93 |
| (3) | Absolute value ΔV of back EMF voltage fluctuation at any one phase measures at or above the predetermined threshold value Vb for four or more consecutive times | 100 | 50 |
| (4) | In addition to (3), back EMF voltage rises and falls alternately at four or more consecutive measuring points in (3) | 100 | 70 |
| (5) | In addition to (3) and (4), absolute value ΔΔV of fluctuation between adjacent absolute values ΔV of the back EMF voltage fluctuation in (4) measures at or below the predetermined threshold Vc (for three consecutive times) | 100 | 75 |
| (6) | Either criterion (2) or (4) is satisfied | 100 | 98 |
| (7) | Either criterion (2) or (5) is satisfied | 100 | 100 |

Criteria (1) to (7) correspond to first to seventh Embodiments, respectively
*T: Torque at time of detection of synchronization loss
**P: Probability of detection In each test, a load was increasingly applied to the output gear of the actuator, a torque was measured when the motor practically lost synchronization, and the ratio of a torque value reading at the time of detection of the state of synchronization loss relative to the value of the torque measured as described above was calculated, which is shown in Method 1, where the ratio is 100% for all tests, which means that the synchronization loss was detected exactly at the time of actually occurring when the load attributable to causing the synchronization loss was applied. Consequently, when the method of detecting the state of synchronization loss based on the criterion of each embodiment described above is used, the stepping motor of the actuator is allowed to perform up to its maximum torque capacity.

In each test, when the output gear of the actuator was locked thereby causing the motor to lose synchronization, the probability of actually detecting synchronization loss was examined with respect to the detection criterion according to each embodiment, wherein when the output gear was locked, the positional relation between a stator yoke and magnetic poles was shifted for each test thereby presenting various states of synchronization loss, and the examination result is shown in Method 2. The first and second embodiments enabled the state of synchronization loss to be duly detected with a probability of 90% or more, and the third, fourth and fifth embodiments enabled the state of synchronization loss to be detected with a probability of 50%, 70% and 75%, respectively. On the other hand, at the sixth embodiment in which synchronization loss is detected based on Criterion (6) defined such that synchronization loss is judged to occur when either Criterion (2) or (4) is satisfied, the state of synchronization loss could be detected with a probability of 98%, and also at the seventh embodiment in which synchronization loss is detected based on Criterion (7) defined such that synchronization loss is judged to occur when either Criterion (2) or (5) is satisfied, the state of synchronization loss could be detected with a probability of 100%. This means that Criteria (1) and (2) can be well complemented when combined with another criterion.

===Other Criteria for Detecting the State of Synchronization Loss===

Criteria (1) and (2) are defined such that the back EMF voltage measures at or below the threshold value Va for at least two times, but the present invention is not limited to such a definition and the state of synchronization loss may be judged to occur when the back EMF voltage once measures at or below the threshold value Va. Also, the present invention is not limited in the combination of a plurality of detection criteria to the definitions of Criteria (6) and (7). By appropriately combining the detection criteria, it can be expected that the state of synchronization is detected with a probability of close to 100%. Needless to say, the state of synchronization loss may be judged to occur when any one of all the criteria is satisfied. If the arrangement is made such that the state of synchronization is judged to occur when any one of a plurality of criteria is satisfied, it is advantageous in saving the time between the actual occurrence of synchronization loss and the detection of synchronization loss.

In the present invention, the state of synchronization loss can be judged to occur when the back EMF voltage at any one phase satisfies the criteria, and therefore the method can be applied to not only a two-phase stepping motor but also an N-phase stepping motor. Also, the present invention is not limited in the timing of measurement of the back EMF voltage to the timings (T1 to T6 in FIGS. 2A and 2B) at which the polarity of control current flowing at each coil is reversed, and the back EMF voltage can be measured at any arbitrary timing within one step period (stp) on the assumption that the halt time (t) is such a short period of time as not to affect the motor rotation.

What is claimed is:

1. A method of detecting a state of synchronization loss in a stepping motor, in which a means for applying one of control current and control voltage to a coil of each phase to thereby drive an N-phase stepping motor and a means for individually measuring a back EMF voltage induced at the coil of each phase are employed, wherein the method comprises the steps of:
    halting application of the one of the control current and the control voltage at the coil of each phase by turns phase by phase for such a short period of time as not to affect rotation of a rotor of the stepping motor at a predetermined timing within one step period of the rotor;
    measuring the back EMF voltage at the coil during the short period of time, the measuring being performed multiple, consecutive times; and
    judging that the stepping motor loses synchronization when a measurement result of the back EMF voltage at the coil of at least one phase satisfies a predetermined detection criterion, the measurement result of the back EMF voltage at the coil of at least one phase being individually analyzed.

2. A method of detecting a state of synchronization loss in a stepping motor according to claim 1, wherein the detection criterion is defined such that the back EMF voltage measures at or below a first predetermined value.

3. A method of detecting a state of synchronization loss in a stepping motor according to claim 2, wherein the detection criterion is defined to further include that an absolute value of a back EMF voltage fluctuation between adjacent measuring points measures at or above a second predetermined value.

4. A method of detecting a state of synchronization loss in a stepping motor according to claim 3, wherein the detection criterion is defined to further include that the absolute value of the back EMF voltage fluctuation between two adjacent measuring points measures at or above the second predetermined value for at least a predetermined consecutive number of times, and at the same time that the back EMF voltage obtained at the consecutive measuring points rises and falls in an alternate manner.

5. A method of detecting a state of synchronization loss in a stepping motor according to claim 4, wherein the detection criterion is defined to further include that a difference between adjacent absolute values of the back EMF voltage fluctuation between adjacent measuring points measures at or below a third predetermined value.

6. A method of detecting a state of synchronization loss in a stepping motor according to claim 1, wherein the detection criterion is defined such that the back EMF voltage measures at or below a first predetermined value for at least a predetermined consecutive number of times.

7. A method of detecting a state of synchronization loss in a stepping motor according to claim 1, wherein the detection criterion is defined such that the back EMF voltage measures at or below a first predetermined value for at least a predetermined number of times through a predetermined number of measuring points.

8. A method of detecting a state of synchronization loss in a stepping motor according to claim 1, wherein the detection criterion is defined such that an absolute value of a back EMF voltage fluctuation between adjacent measuring points measures at or above a second predetermined value.

* * * * *